United States Patent
Zenner et al.

(10) Patent No.: US 10,780,794 B2
(45) Date of Patent: Sep. 22, 2020

(54) ASSEMBLY AND METHOD FOR COOLING A TRACTION BATTERY OF A VEHICLE USING FUEL

(71) Applicant: Ford Global Technologies, LLC, Dearborn, MI (US)

(72) Inventors: Thomas Zenner, Dueren (DE); Daniel Kok, Ann Arbor, MI (US); Caroline Born, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/254,793

(22) Filed: Jan. 23, 2019

(65) Prior Publication Data
US 2019/0225112 A1   Jul. 25, 2019

(30) Foreign Application Priority Data
Jan. 24, 2018   (DE) .................. 10 2018 201 117

(51) Int. Cl.
*B60L 58/26* (2019.01)
*B60K 6/28* (2007.10)
(Continued)

(52) U.S. Cl.
CPC ............... *B60L 58/26* (2019.02); *B60K 6/28* (2013.01); *B60K 15/03* (2013.01); *F02M 37/00* (2013.01);
(Continued)

(58) Field of Classification Search
CPC ........... B60K 2015/03125; B60K 2015/03138; B60K 2015/0325
See application file for complete search history.

(56) References Cited

U.S. PATENT DOCUMENTS 4,703,771 A * 11/1987 Mimura ............... B60K 15/077
                                                                 137/142
4,834,132 A *  5/1989 Sasaki .................... B60K 15/01
                                                                 123/514
(Continued)

FOREIGN PATENT DOCUMENTS

DE   102013220389        4/2015
DE   102013220389 A1 *   4/2015  ........... B60K 15/063
(Continued)

*Primary Examiner* — Kevin R Steckbauer
(74) *Attorney, Agent, or Firm* — David Kelley, Esq.; Carlson, Gaskey & Olds, P.C.

(57) ABSTRACT

The disclosure relates to an assembly for a vehicle, in particular for a hybrid electric vehicle. The assembly includes at least one fuel tank having the form of a saddle tank. The assembly further includes at least one traction battery that is arranged outside the fuel tank and is thermally connected to the fuel tank, and at least one fuel pump arranged in the fuel tank. The fuel pump can convey a fuel from within the fuel tank to an internal-combustion engine of the hybrid electric vehicle. To provide a cooling system for the traction battery, the traction battery can be thermally connected to an active tank portion of the fuel tank, in which the fuel pump is arranged. The traction battery can be connected to the active tank portion via a bridge portion of the fuel tank, which is connected in a communicating manner to a passive tank portion of the fuel tank. Fuel in the passive tank portion can be conveyed into the active tank portion.

20 Claims, 2 Drawing Sheets

(51) Int. Cl.
  *B60K 15/03* (2006.01)
  *F02M 37/00* (2006.01)
  *H01M 10/613* (2014.01)
  *H01M 10/653* (2014.01)
  *H01M 10/6554* (2014.01)
  *H01M 10/625* (2014.01)
  *H01M 10/66* (2014.01)

(52) U.S. Cl.
  CPC ...... *F02M 37/0076* (2013.01); *H01M 10/613* (2015.04); *H01M 10/625* (2015.04); *H01M 10/653* (2015.04); *H01M 10/6554* (2015.04); *H01M 10/66* (2015.04); *B60K 2015/03125* (2013.01); *B60K 2015/03138* (2013.01); *B60K 2015/03243* (2013.01); *B60Y 2200/92* (2013.01); *H01M 2220/20* (2013.01)

(56) References Cited

U.S. PATENT DOCUMENTS

| | | | | |
|---|---|---|---|---|
| 4,838,307 A * | 6/1989 | Sasaki | | B60K 15/077 123/514 |
| 5,082,426 A * | 1/1992 | Sasaki | | B60K 15/077 180/314 |
| 5,732,684 A * | 3/1998 | Thompson | | F02M 37/0052 123/509 |
| 6,113,354 A * | 9/2000 | Meese | | B60K 15/077 123/514 |
| 6,283,142 B1 * | 9/2001 | Wheeler | | F02M 37/0094 123/509 |
| 6,505,644 B2 * | 1/2003 | Coha | | F02M 37/0094 123/514 |
| 6,832,602 B2 * | 12/2004 | Tanimura | | F02M 37/44 123/509 |
| 6,907,899 B2 * | 6/2005 | Yu | | B60K 15/03 123/509 |
| 7,066,153 B2 * | 6/2006 | Vitalis | | F02M 37/0094 123/509 |
| 7,069,914 B2 * | 7/2006 | Nagata | | F02M 37/025 123/509 |
| 7,303,378 B2 * | 12/2007 | Kleppner | | B60K 15/077 417/87 |
| 7,500,473 B2 * | 3/2009 | Kobayashi | | F02M 37/0052 123/509 |
| 7,913,670 B2 * | 3/2011 | Holtz | | F04F 5/44 123/509 |
| 8,590,563 B2 * | 11/2013 | Martin | | F02M 37/025 137/565.22 |
| 8,739,821 B2 * | 6/2014 | Murabayashi | | F02M 37/0023 137/565.22 |
| 8,820,350 B2 * | 9/2014 | Kim | | F02M 37/0094 137/565.22 |
| 8,944,268 B2 * | 2/2015 | Murabayashi | | B60K 15/077 220/4.14 |
| 8,955,545 B2 * | 2/2015 | Murabayashi | | F02M 37/025 137/565.11 |
| 9,114,702 B2 * | 8/2015 | Gebert | | B60K 15/077 |
| 9,278,616 B2 * | 3/2016 | Kopiec | | B60K 15/03 |
| 10,124,791 B2 * | 11/2018 | Dudar | | F04B 23/08 |
| 10,495,039 B2 * | 12/2019 | Porras | | F04F 5/10 |
| 2002/0083983 A1 * | 7/2002 | Coha | | F02M 37/025 137/565.22 |
| 2003/0062031 A1 * | 4/2003 | Tanimura | | F02M 37/025 123/510 |
| 2004/0140009 A1 * | 7/2004 | Yu | | F02M 37/0058 137/565.22 |
| 2004/0219029 A1 * | 11/2004 | Kleppner | | B60K 15/077 417/77 |
| 2005/0183781 A1 * | 8/2005 | Vitalis | | F02M 37/106 137/565.22 |
| 2009/0020894 A1 * | 1/2009 | Holtz | | F02M 37/025 261/37 |
| 2010/0230415 A1 * | 9/2010 | Eulitz | | B29C 66/53247 220/562 |
| 2012/0118401 A1 * | 5/2012 | Murabayashi | | B60K 15/077 137/123 |
| 2013/0048119 A1 * | 2/2013 | Kim | | F02M 37/0094 137/565.01 |
| 2014/0246440 A1 * | 9/2014 | Kopiec | | B60K 15/03 220/563 |
| 2018/0162353 A1 * | 6/2018 | Dudar | | F04F 5/24 |
| 2018/0283331 A1 * | 10/2018 | Porras | | F02M 37/025 |
| 2019/0032614 A1 * | 1/2019 | Fukuoka | | F02M 37/20 |
| 2019/0092163 A1 * | 3/2019 | Amano | | B60K 15/073 |
| 2019/0202500 A1 * | 7/2019 | Montgomery | | B62D 21/16 |
| 2019/0225110 A1 * | 7/2019 | Zenner | | B60L 58/26 |
| 2019/0225111 A1 * | 7/2019 | Zenner | | B60L 58/26 |
| 2020/0003166 A1 * | 1/2020 | Porras | | F04F 5/10 |

FOREIGN PATENT DOCUMENTS

| | | | | |
|---|---|---|---|---|
| JP | | 2007302123 | 11/2007 | |
| JP | | 2007320331 | 12/2007 | |
| KR | | 20080003495 | 1/2008 | |
| WO | WO-2015158454 A1 * | | 10/2015 | ......... F02M 37/0094 |

\* cited by examiner

ASSEMBLY AND METHOD FOR COOLING A TRACTION BATTERY OF A VEHICLE USING FUEL

CROSS-REFERENCE TO RELATED APPLICATIONS

This application claims priority to German Patent Application No. 102018201117.6, which was filed on 24 Jan. 2018 and is incorporated herein by reference in its entirety.

TECHNICAL FIELD

This disclosure relates generally to cooling a traction battery and, more particularly, to cooling using fuel communicated from a passive tank portion of a fuel tank to an active tank portion of the fuel tank.

BACKGROUND

Hybrid electric vehicles have at least one traction battery, by means of which, during electric drive mode of the hybrid electric vehicle, electrical drive devices of the hybrid electric vehicle can be supplied with electrical energy. The traction battery can be arranged in the hybrid electric vehicle in such a manner that the passenger compartment and the storage space of the hybrid electric vehicle are limited to the smallest possible extent or not at all. To this end, the traction battery is, for example, constructed as an underfloor unit, in particular below the rear bench type seat and at the front side with respect to the rear axle of the hybrid electric vehicle. In this instance, the traction battery shares a structural space with the fuel tank of the hybrid electric vehicle, which leads to a reduced tank volume.

An arrangement where the traction battery is close to other components of the hybrid electric vehicle may make the required cooling of the traction battery more difficult, for example, when surfaces of the traction battery cannot be subjected to a cooling air flow. This can lead to poor heat discharge from the traction battery and consequently to higher operating temperatures of the traction battery and the battery cells thereof, which can lead to a reduction of the battery power and/or the battery service-life.

Some motor vehicles include a fuel tank taking the form of a saddle tank. Within the fuel tank is a fuel pump that conveys a fuel from the fuel tank to an internal-combustion engine of the motor vehicle. Such a fuel tank can include an active tank portion, in which the fuel pump is arranged, and a passive tank portion. The passive tank portion is connected to the active tank portion in communicating manner via a bridge portion. The bridge portion forms a tunnel on a floor of the fuel tank. An exhaust pipe can be guided through the tunnel. Fuel located in the passive tank portion can be conveyed into the active tank portion by exploitation of the Venturi effect or, to be more precise, by use of a Venturi nozzle connected to the fuel pump on the pressure side, to which a suction line terminating in the passive tank portion is connected.

JP 2007 302 123 A discloses a motor vehicle having a battery which is arranged adjacent to a fuel tank so that, in order to cool the battery, heat of the battery can be transferred to fuel in the fuel tank. An electronic control system decides on the basis of the temperature of the battery whether it is necessary to cool the battery or not. If it is necessary to cool the battery, the electronic control system controls an electromagnetic valve so that at least a portion of the fuel discharged from the fuel tank can be returned to the fuel tank through a return line. If the fuel circulates over this path, the fuel loses heat, whereby a heat exchange between the battery and the fuel is brought about.

JP 2007 320 331 A discloses a hybrid electric vehicle having a battery which is immersed in a liquid fuel inside a fuel tank. The battery can be cooled by a coldness of the fuel. When the hybrid electric vehicle travels, the fuel moves inside the fuel tank as a result of a speed change or the hybrid electric vehicle travelling around a bend, whereby the inner side of the battery is cooled.

DE 10 2013 220 389 A1 discloses a passenger car with a fuel tank, arranged near and predominantly in front of the rear axle of the vehicle and extending with a partial volume from the middle of the vehicle to both sides of the vehicle, in the form of a saddle tank, and also with an electrical-energy storage device, the housing of which overlaps, in a projection in the transverse direction of the vehicle and/or in the direction of the vertical axis of the vehicle, with a partial region of the fuel tank. The housing of the electrical-energy storage device is in heat-conducting communication with the fuel tank.

US 2010/0230415 A1 discloses a fuel container in the form of a saddle tank made of thermoplastic synthetic material with at least one peripheral seam, with a filling opening, with means for aerating and de-aerating, and with means for the conveying and extraction of fuel, in the form of at least one fuel-conveying unit arranged within the fuel container, and with fluid lines and/or electrical lines guided into the fuel container and/or out of the latter. No opening and/or breach, the diameter of which is significantly larger than the diameter of the line in question, is provided in the wall of the fuel container.

KR 100 896 132 B1 discloses an energy-storage system for a hybrid vehicle with an internal-combustion engine and with a battery pack. A fuel tank of the hybrid vehicle covers at least two sides of the battery pack. The fuel tank has a symmetrical structure in which principal storage parts are arranged on two sides of the battery pack. The fuel tank exhibits a saddle shape in which a central portion has been subdivided into a first side, with the principal storage device, and a second side with a receiving part on which the battery pack has been installed.

SUMMARY

In an exemplary embodiment of the present disclosure, a traction battery is thermally connected to an active tank portion of the fuel tank, in which the fuel pump is arranged. Via a bridge portion of the fuel tank the active tank portion is connected in communicating manner to a passive tank portion of the fuel tank. Fuel from the passive tank portion can be conveyed into the active tank portion.

In the exemplary embodiment, the traction battery can be cooled by means of the fuel tank and by means of the fuel located in the fuel tank, in which connection the fuel tank and the fuel form a heat sink. The traction battery can be thermally connected to the fuel tank in such a manner that a transfer of heat from the battery cells of the traction battery to the fuel tank is possible with little thermal resistance. The surface of the fuel tank can be used for the purpose of enlarging the available heat-emitting surface. In some examples, no additional air cooling or liquid cooling is necessary, so the cooling, according to the exemplary embodiment, of the traction battery can be realized inexpensively.

Due to the thermal connection of the traction battery to the active tank portion, it is reliably ensured that at least a minimal amount of fuel is always available in or on a connecting portion of the fuel tank to which the traction battery is thermally connected. The connecting portion is can be that portion of the fuel tank to which the traction battery is directly connected physically or indirectly connected with interposition of at least one thermally conductive body or material. By this means, the connecting portion is thermally connected to the traction battery.

The fuel tank can be formed partially or completely from a metal sheet, to facilitate a good transfer of heat between the traction battery and the fuel. This configuration of the fuel tank can also provide an advantage in the case of a pressurized fuel system of a vehicle, in particular of a hybrid electric vehicle, such as is customarily present in a plug-in hybrid electric vehicle. Alternatively, the fuel tank may have been formed partially or completely from a synthetic material or a composite material.

The traction battery arranged outside the fuel tank and thermally connected to the fuel tank can include several battery cells, for instance lithium-ion battery cells, which may have been combined to form individual battery-cell modules. The battery cells may have been integrated within a battery housing of the traction battery in such a manner that heat is transferred directly from the battery cells to the battery housing. For this purpose, the battery cells have can be directly connected to the portion of the battery housing that is connected to the connecting portion of the fuel tank.

The traction battery can be connected to the fuel tank in such a manner that a clamping force is generated between the traction battery and the fuel tank. This can facilitate a maximal surface contact between the traction battery and the fuel tank, so that an optimal transfer of heat from the traction battery to the fuel tank can take place.

In an exemplary embodiment, the traction battery can be arranged on the floor below the active tank portion. By this means, a relatively large connecting portion of the fuel tank is available for connecting the traction battery to the active tank portion. The active tank portion may have a reduced overall height in comparison with the passive tank portion. For instance, the overall height of the passive tank portion may correspond to the sum of the overall height of the active tank portion and the overall height of the traction battery.

In a further exemplary embodiment, a bottom wall of the bridge portion at least one partition projecting into the fuel tank is arranged which extends along the entire bridge portion. Accordingly, fuel located in the active tank portion is prevented from sloshing into the passive tank portion during the running of the vehicle, in particular of the hybrid electric vehicle. In addition, sloshing noises that arise within the fuel tank by virtue of a movement of the fuel during a journey can be reduced, improving the ride comfort of a corresponding vehicle, in particular of a hybrid electric vehicle, particularly since corresponding noises would be distinctly perceptible during a quiet electric operating mode of the vehicle, in particular the hybrid electric vehicle.

In a further exemplary embodiment, the traction battery is at least partially thermally connected to the fuel tank via a heat-conducting paste or at least one heat-distribution plate. By means of the heat-conducting paste, the transfer of heat between the traction battery and the fuel tank can be improved. For this purpose, the heat-conducting paste is applied in advance, for instance over the surface, onto the traction battery and/or onto the connecting portion of the fuel tank. By means of the heat-distribution plate, the heat generated in the battery cells of the traction battery can be distributed to the entire contact surface between the traction battery and the connecting portion of the fuel tank, making the cooling of the traction battery more uniform and consequently more effective.

In an exemplary embodiment, a hybrid electric vehicle incorporates an assembly having the features of any one of the above-mentioned embodiments or any combination of at least two of these embodiments with each other.

The advantages mentioned above with regard to the assembly can accordingly be connected with a vehicle, in particular a hybrid electric vehicle. The vehicle, in particular the hybrid electric vehicle, may, for example, be a plug-in hybrid electric vehicle. The hybrid electric vehicle can have at least one internal combustion engine that can be supplied with fuel from the fuel tank by means of the fuel pump.

Although embodiments of this disclosure are being described in particular with reference to hybrid vehicles, purely electric vehicles are also included within the scope of this disclosure. Although electric vehicles have no internal combustion engine for driving the vehicle, they may have fuel-operated units, such as, for example, fuel-operated auxiliary heating systems. These electric vehicles can have a fuel tank that stores the fuel for the fuel-operated units. This fuel tank of the purely electric vehicle or the fuel stored in the fuel tank may as described above be used for cooling the battery as necessary by the above-described advantageous arrangement and configuration of the fuel tank being used.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to an assembly for a vehicle, in particular for a hybrid electric vehicle. The assembly includes at least one fuel tank that can take the form of a saddle tank. At least one traction battery is arranged outside the fuel tank and is thermally connected to the fuel tank. At least one fuel pump, arranged in the fuel tank, helps to convey a fuel from the fuel tank to an internal-combustion engine of the vehicle, in particular the hybrid electric vehicle.

The features and measures set out individually in the following description can be combined with each other in any technically advantageous manner to provide other embodiments of the present disclosure.

Figure 1:
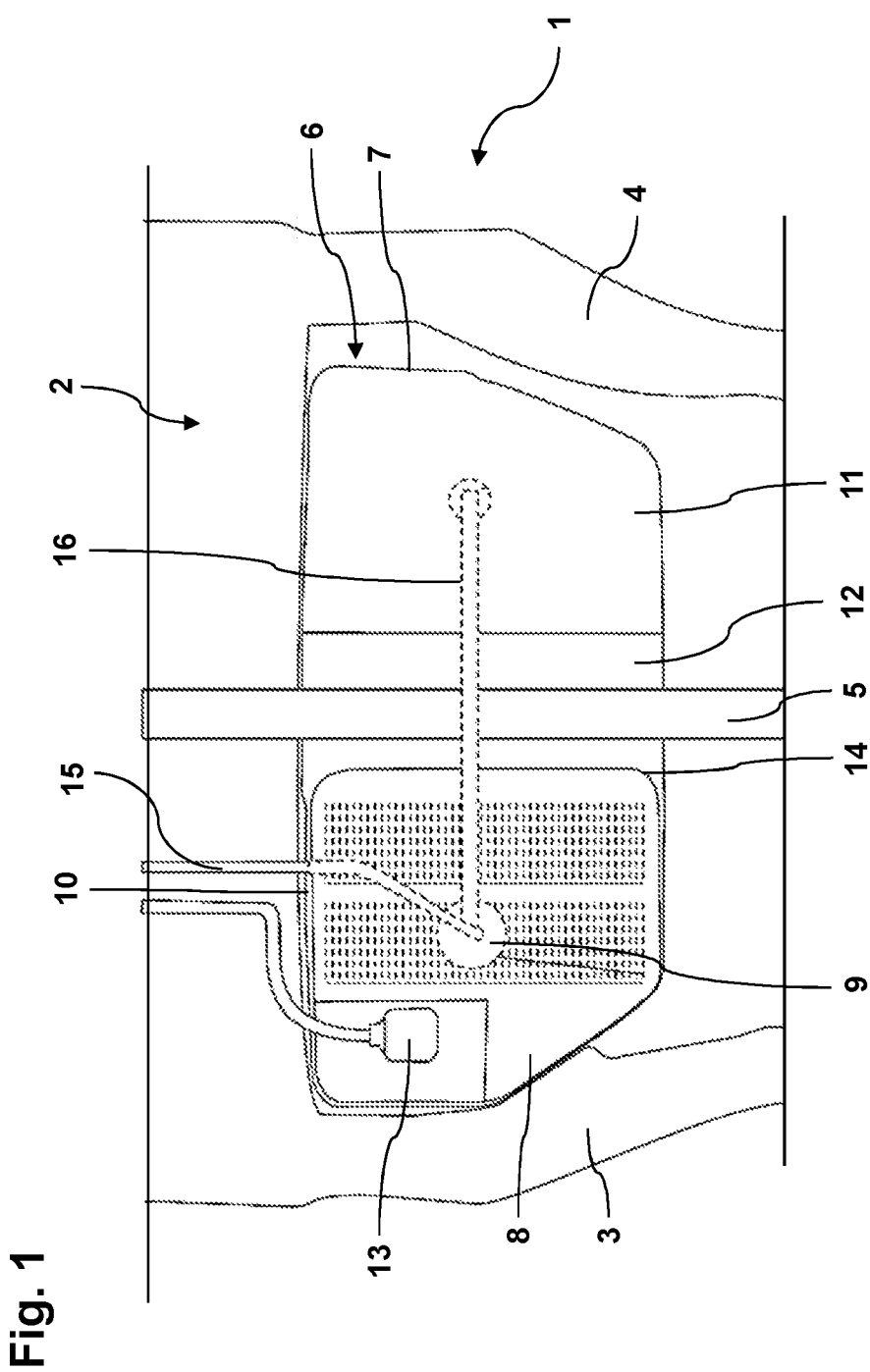
FIG. 1 illustrates a schematic bottom view of a rear portion of an embodiment of a hybrid electric vehicle according to an exemplary embodiment of the present disclosure.

FIG. 1 shows a schematic bottom view of a rear portion of an embodiment of a vehicle according to an exemplary aspect of the present disclosure. The example vehicle is a hybrid electric vehicle 1, which in the following will be designated as a hybrid electric vehicle 1. The hybrid electric vehicle 1 exhibits an underbody 2 with two lateral side members 3 and 4. In addition, a portion of an exhaust pipe 5 is shown. The exhaust pipe 5 extends in the longitudinal direction of the vehicle.

The hybrid electric vehicle 1 includes an assembly 6 having a fuel tank 7 taking the form of a saddle tank, a traction battery 8 arranged outside the fuel tank 7 and thermally connected to the fuel tank 7, and a fuel pump 9, arranged in the fuel tank 7. The fuel pump 9 can convey a fuel which is available in the fuel tank 7 to an internal-combustion engine, not shown, of the hybrid electric vehicle 1.

Figure 2:
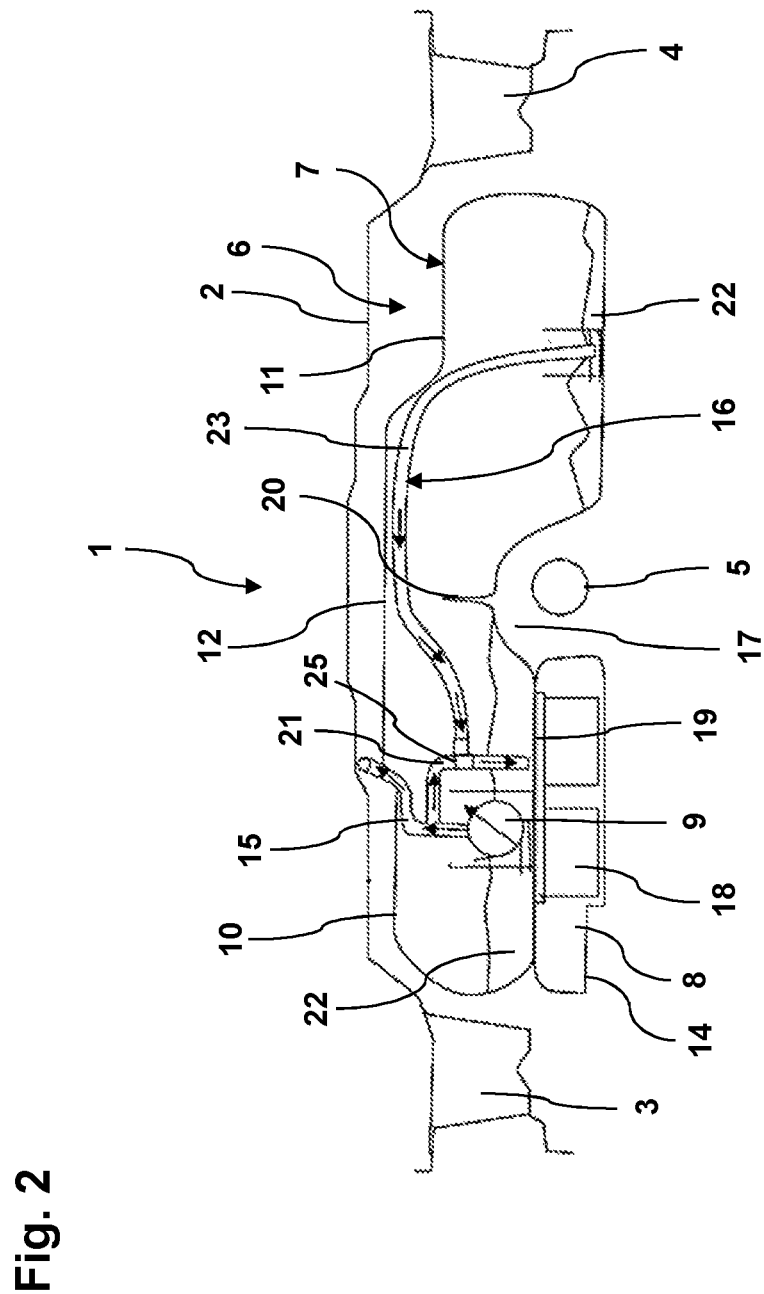
FIG. 2 illustrates a schematic sectional representation of the hybrid electric vehicle shown in FIG. 1.

The fuel tank 7 exhibits an active tank portion 10, in which the fuel pump 9 is arranged, a passive tank portion 11, and a bridge portion 12 connecting the active tank portion 10 to the passive tank portion 11 in communicating manner. The active tank portion 10 has a smaller overall height than the passive tank portion 11, as is illustrated in FIG. 2. The bridge portion 12 has the smallest overall height and defines on the floor a tunnel through which the exhaust pipe 5 is guided, as is also illustrated in FIG. 2. On a bottom wall of the bridge portion 12 is a partition 20, projecting into the fuel tank 7. The partition 20 extends in the longitudinal direction of the vehicle along the entire bridge portion 12.

In the different Figures, identical components are always provided with the same reference numerals, for which reason they are generally also only described once.

The traction battery 8 may have been thermally connected to the fuel tank 7 at least partially via a heat-conducting paste, not shown. The traction battery 8 is connected via a battery terminal 13 to further electric components, not shown, of the hybrid electric vehicle 1.

The example traction battery 8 exhibits several battery modules shown in FIG. 2, which are each directly connected thermally and physically to a heat-distribution plate, illustrated in FIG. 2, of the traction battery 8, which in turn is directly connected thermally and physically to a battery housing 14 of the traction battery 8. The battery housing 14 is thermally connected to the active tank portion 10, for instance via the heat-conducting paste which is not shown.

Connected to the fuel pump 9 on the pressure side is a fuel supply line 15 which is used for supplying an internal-combustion engine, not shown, of the hybrid electric vehicle 1 with fuel. Moreover, connected to the pressure side of the fuel pump 9 is a conveying unit 16 with which the fuel can be conveyed out of the passive tank portion 11 into the active tank portion 10, the structure and mode of operation of said conveying unit becoming clear from FIG. 2.

The traction battery 8 is accordingly thermally connected to the active tank portion 10 of the fuel tank 7, in which the fuel pump 9 is arranged and which is connected in communicating manner via the bridge portion 12 of the fuel tank 7 to the passive tank portion 11 of the fuel tank 7, from which the fuel can be conveyed into the active tank portion 10. In particular, the traction battery 8 is arranged on the floor below the active tank portion 10 or geodetically lower than the active tank portion 10.

FIG. 2 shows a schematic sectional representation of the hybrid electric vehicle 1 shown in FIG. 1. As shown, the active tank portion 10 has a smaller overall height than the passive tank portion 11. In addition, it can be seen that the bridge portion 12 has the smallest overall height and defines on the floor a tunnel 17 through which the exhaust pipe 5 is guided. Moreover, two battery modules 18 of the traction battery 8 are shown which are each directly connected thermally and physically to the heat-distribution plate 19 of the traction battery 8. Arranged on the bottom wall of the bridge portion 12 is the partition 20 projecting into the fuel tank 7, which extends in the longitudinal direction of the vehicle along the entire bridge portion 12.

As shown, a lowermost floor of the active tank portion is vertically higher than a lowermost floor of the passive tank portion. Vertical for purposes of this disclosure refers to the general orientation of the vehicle during operation and with reference to ground or the horizon.

The conveying unit 16 exhibits a line 21 branching off from the fuel supply line 15, with which some of the fuel 22 aspirated with the fuel pump 9 can be supplied again to the active tank portion 10. Attached to line 21 is a conveying line 23 which extends right into the vicinity of the bottom of the passive tank portion 11. When the fuel pump 9 is activated, fuel 22 flows through line 21, which exhibits a Venturi nozzle 25, to which the conveying line 23 is attached. By virtue of the underpressure generated with the Venturi nozzle 25, the fuel 22 is aspirated via the conveying line 23 and supplied to the active tank portion 10 via line 21. The flows of fuel existing when the fuel pump 9 is activated are indicated by the arrows.

Although exemplary embodiments of this disclosure are described in particular with reference to hybrid vehicles, purely electric vehicles are also included within the scope of this disclosure. Although purely electric vehicles may have no internal combustion engine for driving the vehicle, they may have fuel-operated units, such as, for example, fuel-operated auxiliary heating systems. These electric vehicles naturally have in this regard a fuel tank which stores the fuel for the fuel-operated units. This fuel tank of the purely electric vehicle or the fuel which is stored in the fuel tank can be used as described above for cooling the battery as required, by using the above described fuel tank arrangements and configurations, for example.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly of a vehicle, comprising:
   at least one fuel tank including an active tank portion, a bridge portion, and a passive tank portion;
   at least one traction battery that is arranged outside the fuel tank and is thermally connected to the active tank portion of the fuel tank; and
   at least one fuel pump that is arranged in the active tank portion of the fuel tank, the at least one fuel pump configured to convey a fuel in the fuel tank to an internal-combustion engine of the vehicle, the fuel pump configured to connect in a communicating manner to the passive tank portion of the fuel tank via the bridge portion such that the fuel pump can convey fuel into the active tank portion from the passive tank portion.

2. The assembly of claim 1, wherein the vehicle is a hybrid electric vehicle.

3. The assembly of claim 1, wherein the traction battery is arranged on a floor of the active tank portion.

4. The assembly of claim 1, further comprising at least one partition projecting into an interior of the fuel tank from a bottom wall of the bridge portion.

5. The assembly of claim 4, wherein the at least one partition extends in a longitudinal direction of the vehicle along the entire bridge portion.

6. The assembly of claim 1, wherein the traction battery is thermally connected to the fuel tank at least partially via a heat-conducting paste.

7. The assembly of claim 1, wherein the traction battery is thermally connected to the fuel tank at least partially via at least one heat-distribution plate.

8. The assembly of claim 1, wherein the tank has the form of a saddle tank.

9. The assembly of claim 1, wherein a lowermost floor of the active tank portion is vertically higher than a lowermost floor of the passive tank portion.

10. The assembly of claim 1, wherein the tank has the form of a saddle tank, and a lowermost floor of the active tank portion is vertically higher than a lowermost floor of the passive tank portion, and further comprising a partition projecting into an interior of the fuel tank from a bottom wall of the bridge portion, the partition extending in a longitudinal direction of the vehicle along the entire bridge portion.

11. An assembly of a vehicle, comprising:
at least one fuel tank including an active tank portion, a bridge portion, and a passive tank portion;
at least one traction battery that is arranged outside the fuel tank and is thermally connected to the active tank portion of the fuel tank;
a conveying line extending from the passive tank portion, through the bridge portion, to the active tank portion; and
at least one fuel pump that is arranged in the active tank portion of the fuel tank; and
the at least one fuel pump configured to communicate fuel from the active tank portion to an internal-combustion engine of the vehicle, the conveying line configured to communicate fuel from the passive tank portion to the active tank portion as the at least one fuel pump communicates fuel from the active tank portion to the internal-combustion engine.

12. The assembly of claim 11, wherein the vehicle is a hybrid electric vehicle.

13. The assembly of claim 11, wherein the conveying line is configured to communicate fuel from the passive tank portion to the active tank portion by virtue of underpressure, wherein a lowermost floor of the active tank portion is vertically higher than a lowermost floor of the passive tank portion.

14. The assembly of claim 13, further comprising a Venturi nozzle that generates the underpressure.

15. The assembly of claim 11, further comprising at least one partition projecting into an interior of the fuel tank from a bottom wall of the bridge portion.

16. The assembly of claim 15, wherein the at least one partition extends in a longitudinal direction of the vehicle along the entire bridge portion.

17. A method of cooling a traction battery, comprising:
communicating fuel from a passive tank portion of a fuel tank, through a bridge portion of the fuel tank, to an active tank portion, wherein at least one traction battery is arranged outside the fuel tank and is thermally connected to the active tank portion of the fuel tank; and
communicating fuel from the active tank portion to an internal combustion engine of a hybrid electric vehicle.

18. The method of claim 17, further comprising using underpressure to draw fuel through a conveying line from the passive tank portion, through the bridge portion, to the active tank portion.

19. The method of claim 18, further comprising generating the underpressure using a Venturi nozzle.

20. The method of claim 17, wherein a lowermost floor of the active tank portion is vertically higher than a lowermost floor of the passive tank portion.

* * * * *